Sept. 4, 1928.  
L. E. POOLE  
1,683,261  
APPARATUS FOR SPREADING THE RISER BARS OF COMMUTATORS  
Filed July 6, 1926
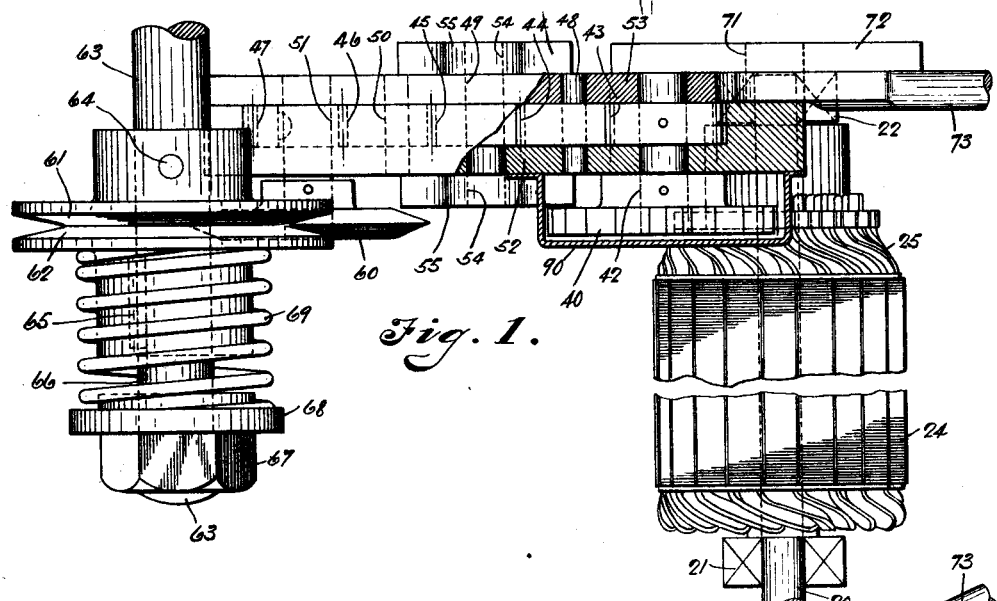
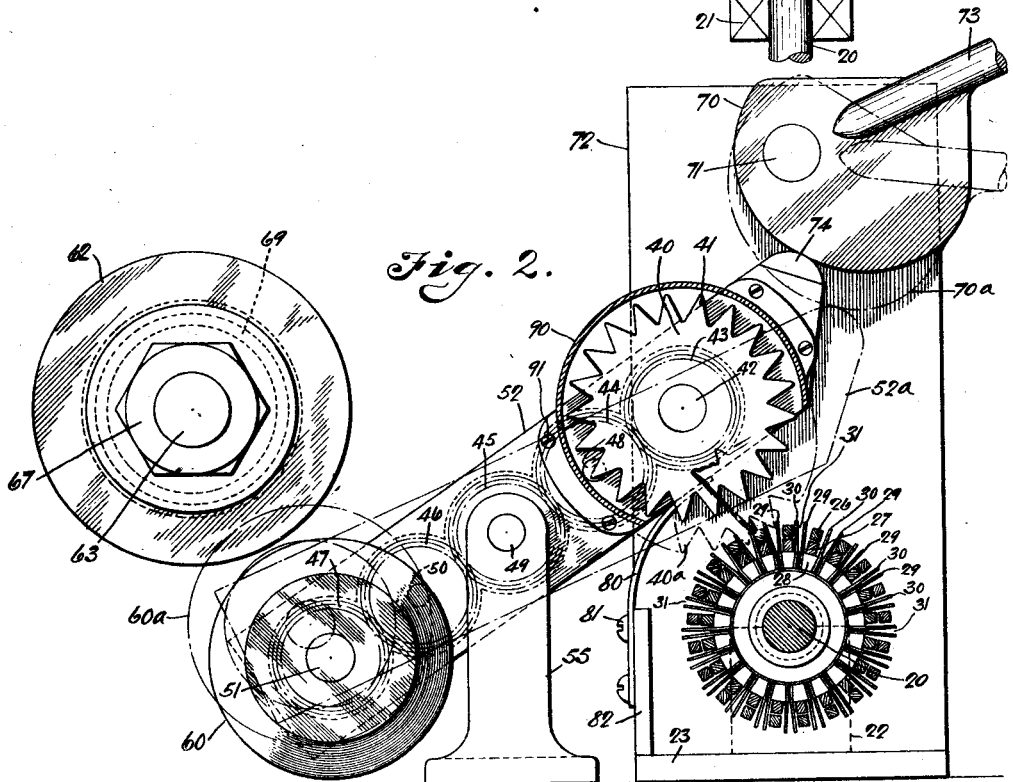
Inventor  
Lora E. Poole  
By Spencer Sewall and Hardman  
his Attorneys Patented Sept. 4, 1928.

1,683,261

UNITED STATES PATENT OFFICE.

LORA E. POOLE, OF ANDERSON, INDIANA, ASSIGNOR, BY MESNE ASSIGNMENTS, TO DELCO-REMY CORPORATION, OF DAYTON, OHIO, A CORPORATION OF DELAWARE.

APPARATUS FOR SPREADING THE RISER BARS OF COMMUTATORS.

Application filed July 6, 1926. Serial No. 120,761.

This invention relates to the manufacture of armatures for dynamo electric machines and particularly to apparatus for spreading the riser bars of the commutator preparatory to attaching the riser bars to the ends of the armature conductors.

The present invention is especially adapted to the manufacture of armatures as disclosed in Patent No. 1,556,892 of R. H. Ahlers and E. M. Polk. This patent discloses a machine for operating upon a commutator, each segment of which is associated with a pair of flexible riser bars which are spaced to receive the ends of at least two armature conductor bars. The machine includes a plurality of radially extending and radially slidable forming members each adapted to move into a space between adjacent members of adjacent pairs of riser bars so that the members of each pair of riser bars will be formed around the armature conductor bar ends which are located within the space between members of each pair of riser bars. One object of the present invention is to prepare the commutator for operation upon a machine such as described in Patent No. 1,556,892, by spreading the adjacent members of adjacent pairs of riser bars so that spaces will be provided for receiving the members which form the pairs of riser bars about the armature conductor bar ends respectively.

Further objects and advantages of the present invention will be apparent from the following description, reference being had to the accompanying drawings, wherein a preferred form of embodiment of the present invention is clearly shown.

In the drawings:

Figs. 1 and 2 are plan and elevational views partly in section respectively of a machine embodying the present invention.

Referring to the drawings, 20 designates a shaft supported by bearing blocks 21 and 22 which are carried by a suitable base 23. The shaft 20 supports an armature 24 having single turn bar windings 25. The ends of these bar windings are shown in section in Fig. 2 and are located in concentric circular rows. Each conductor 25 has an end located in the outer row 26 and an end located in the inner row 27. Each commutator segment 28 is associated with a pair of flexible riser bars, the members of which are designated by numerals 29 and 30. The spaces between the risers 29 and 30 of each pair receive at least two conductor bar ends such as the ends designated by 26 and 27 in Fig. 2.

Initially the spaces 31 between adjacent members 29 and 30 of adjacent pairs of riser bars vary in width and in angular spacing. In order that the commutator may be prepared for operation upon it by a machine for forming the bars 29 and 30 of each pair about the bar ends which are located between the riser members 29 and 30, it is necessary to spread adjacent riser bars 30 and 29 in order that the spaces 31 between them will be more nearly equal in width and in angular spacing. This result is accomplished by a toothed disc 40 having its teeth 41 so shaped and spaced that they are adapted successively to enter successive spaces 31 between the adjacent riser bar members 30 and 29, thus driving the commutator gear-fashion while spreading the riser bars in order to equalize the spaces 31. The disc 40 is attached to a shaft 42 connected with a gear 43. Gear 43 is driven by intermeshing gears 44, 45, 46, and 47 which are mounted upon shafts 48, 49, 50 and 51 respectively. These shafts 42, 48, 49, 50 and 51 are supported by a gear box 52 and a gear cover 53 attached to the gear box in any suitable manner. The gear box and cover assembly are pivoted upon trunnions 54 provided by the shaft 49, these trunnions being supported by brackets 55.

The shaft 51 is drivingly connected with a friction wheel 60 adapted to be moved into engagement with friction wheels 61 and 62 which are rotated by driving a power driven shaft 63. The wheel 61 is fixed to the shaft 63 by pin 64, and the wheel 62 is slidably splined to the shaft 63 by a key 65 movable in a slot 66. A nut 67 is threadedly connected with one end of the shaft 63 in order to retain in position a washer 68. A spring 69 is located between the washer 68 and the friction wheel 62 in order to urge the latter toward the friction wheel 61.

The toothed disc 40 is moved toward the commutator and is connected with the power driven shaft 63 by a cam 70 which is pivoted upon a rod or stud 71 attached to a post 72 carried by the base 23. The cam 70 is operated by a handle 73. When the handle 73 is moved downwardly in order to move the cam into the position 70ª indicated by dot and dash lines, the cam 70 will engage a wear piece 74 attached to the gear box 52 in order to move the gear box into the dot and dash line position 52ª. This operation will of course move the toothed wheel 40 into the dot and dash line position 40ª and the friction wheel 60 will be moved in the dot and dash line position 60ª. This movement of the gear box will cause the toothed wheel 40 to enter one of the spaces 31 between adjacent members of adjacent pairs of riser bars. Just as one of the teeth 41 begins to enter one of the spaces 31, the friction wheel 60 will be engaged by the friction wheels 61 and 62 so that the disc 40 will be rotated and the commutator will be rotated due to the consecutive intermeshing of the teeth 41 with the spaces 31. As the gear box 52 continues to move in a clockwise direction the toothed disc will move further toward the center of the shaft 20 and the teeth 41 will enter further into the spaces 31 in order to spread the adjacent riser members 30 and 29 of adjacent pairs of risers so that the space 31 and the angular spacing between adjacent pairs of risers may be equalized. As the teeth 41 enter deeper into the notches 31, more power is required to spread the risers in order that they will remain in the desired position after pressure upon them by the teeth 41 is relieved. Consequently the pressure applied between the friction wheels 62 and 60 is increased as the disc 40 moves toward the commutator. The spring 69 will yield slightly to permit movement of the wheel 62 relative to the wheel 61 as the wheel 60 moves nearer the shaft 63. Thus the friction pressure between the wheels 62 and 60 is increased as the disc 40 moves toward the commutator. The shaft 51 is feather-keyed to the gear 47 so that the wheel 60 may move endwise and adapt itself for engagement by the friction wheels 61 and 62 as the wheel 60 moves toward the shaft 63.

After the spreading operation has been performed, the handle 73 is released. A leaf spring 80 attached by screws 81 with suitable support 82 will cause the cam 70 and the gear box 52 to return to normal position indicated by continuous lines in the drawings.

A guard 90 attached by screws 91 to the gear box 52 may be used in order to protect the operator from injury by the toothed disc 40.

It is therefore apparent that the commutator riser bars may be spread and spaced very rapidly by the use of the present invention. The operator has but to place the armature shaft 20 upon the bearing blocks 21 and 22 which are so spaced that the commutator riser bars will be located in the path of movement of the toothed disc 40. The handle 73 is pressed downwardly for a brief period sufficient to permit several revolutions of the commutator to take place while being engaged by the disc 40. Only a few seconds are required for placing the shaft 20 upon its bearings operating the handle 73 and then removing the armature from the apparatus.

While the form of embodiment of the present invention as herein disclosed, constitutes a preferred form, it is to be understood that other forms might be adopted, all coming within the scope of the claims which follow.

What is claimed is as follows:

1. Apparatus for bending the riser bars of a commutator, comprising in combination, means for supporting a shaft carrying a commutator having segments and a pair of bendable spaced riser bars associated with each of its segments, the riser bars of each pair defining an armature conductor receiving space, said shaft carrying a bar wound armature having the ends of its bar conductors located in certain of said spaces; a member having teeth each adapted to enter between the adjacent risers of adjacent commutator segments in order to increase the space between said risers by bending the risers toward the armature conductor bar ends adjacent thereto, the spacing of said teeth corresponding to the spacing of the pairs of risers; means for rotating the shaft while the commutator is engaged by the toothed member; and means for moving the toothed member toward or away from the commutator.

2. Apparatus for bending the riser bars of a commutator, comprising in combination, means for supporting a shaft carrying a commutator having segments and a pair of bendable, spaced riser bars associated with each of its segments, the riser bars of each pair defining an armature conductor receiving space, said shaft carrying a bar wound armature having the ends of its bar conductors located in certain of said spaces; a rotatable disc having teeth each adapted to enter between the adjacent risers of adjacent commutator segments in order to increase the space between said risers by bending the risers toward the armature conductor bar ends adjacent thereto, the spacing of said teeth corresponding to the spacing of the pairs of risers; means for moving the disc bodily toward or away from the commutator; and means for effecting rotation of the disc and commutator.

3. Apparatus for bending the risers bars of a commutator, comprising in combination, means for supporting a shaft carrying a commutator having segments and a pair of bendable, spaced riser bars associated with each of its segments, the riser bars of each pair defining an armature conductor receiving space, said shaft carrying a bar wound armature having the ends of its bar conductors located in certain of said spaces; a rotatable disc having teeth each adapted to enter between the adjacent risers of adjacent commutator segments in order to increase the space between said risers by bending the risers toward the armature conductor bar ends adjacent thereto, the spacing of said teeth corresponding to the spacing of the pairs of risers; means for moving the disc bodily toward or away from the commutator; and means responsive to said bodily movement of the disc toward the commutator for applying power to the disc to rotate the same.

4. Apparatus for bending the riser bars of a commutator, comprising in combination, means for supporting a shaft carrying a commutator having segments and a pair of bendable, spaced riser bars associated with each of its segments, the riser bars of each pair defining an armature conductor receiving space, said shaft carrying a bar wound armature having the ends of its bar conductors located in certain of said spaces; a rotatable disc having teeth each adapted to enter between the adjacent risers of adjacent commutator segments in order to increase the space between said risers by bending the risers toward the armature conductor bar ends adjacent thereto, the spacing of said teeth corresponding to the spacing of the pairs of risers; means supporting the toothed disc for rotary and bodily movement; a friction wheel carried by said supporting means and drivingly connected with the toothed disc; a power driven friction wheel; and means for moving the disc support to cause the disc to engage the commutator and the friction wheels to be connected.

In testimony whereof I hereto affix my signature.

LORA E. POOLE.